May 17, 1960  D. L. SOUTHAM ET AL  2,936,715
SEAL ASSEMBLY
Filed Nov. 14, 1955
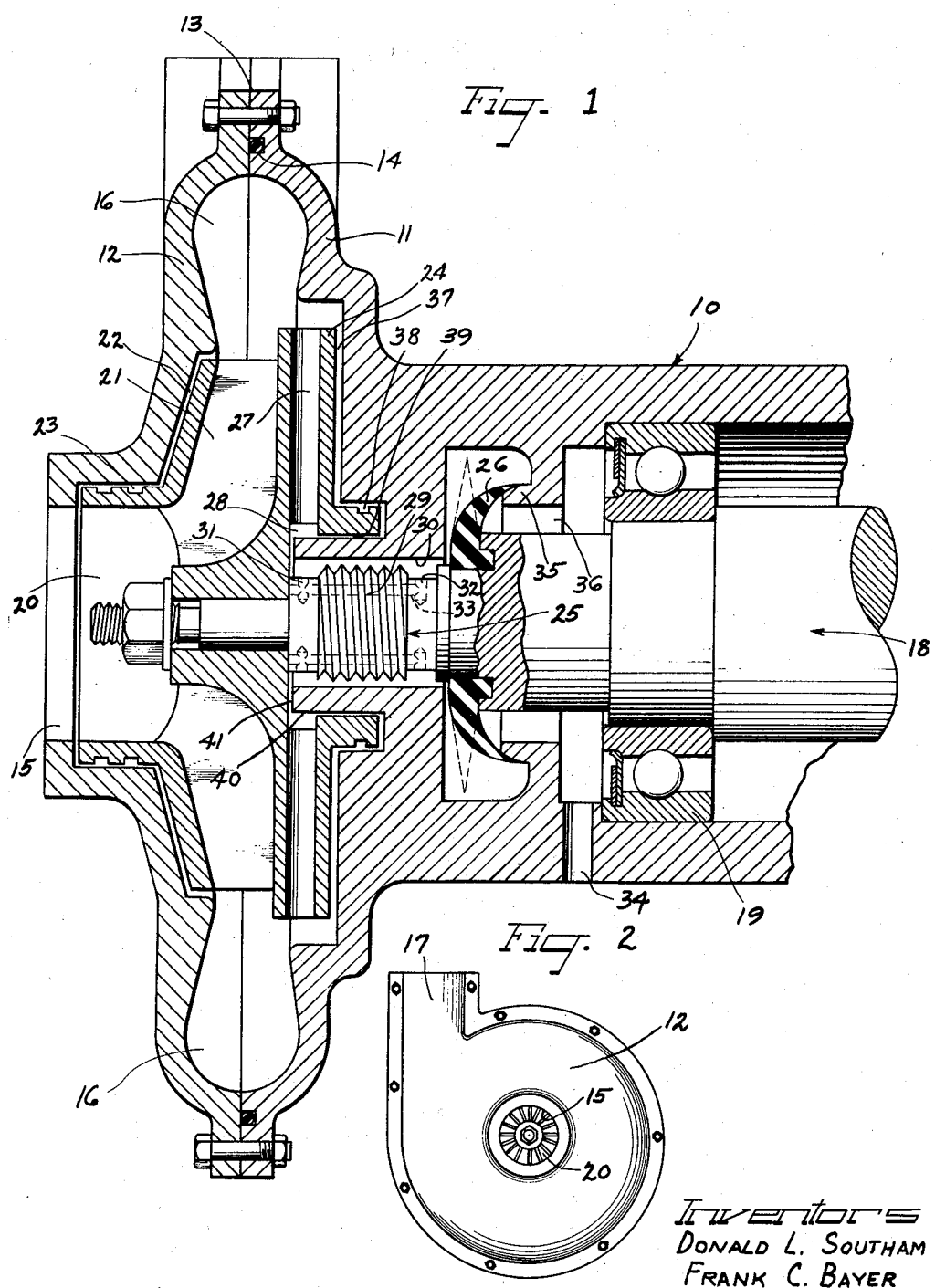
Inventors
Donald L. Southam
Frank C. Bayer
by Hill, Sherman, Meroni, Gross & Simpson Attys.

United States Patent Office 2,936,715
Patented May 17, 1960

2,936,715

SEAL ASSEMBLY

Donald L. Southam, Cleveland Heights, and Frank C. Bayer, Euclid, Ohio, assignors to Thompson Ramo Wooldridge Inc., a corporation of Ohio Application November 14, 1955, Serial No. 546,387

3 Claims. (Cl. 103—103)

This invention relates generally to a seal assembly for rotating machinery, and more particularly to a sealing device which will operate without rubbing parts. Specifically, the present invention deals with a seal assembly that is particularly adaptable for use in association with a rotary pump, such as a centrifugal pump, although other uses and purposes may be apparent to one skilled in the art.

The advent of the turbo jet and ram jet engines has created the need for line mounted accessories which utilize ram or compressed air as a power source. Prominent among these accessories is the air turbine drive centrifugal fuel pump. Pump design requirements of minimum size and weight coupled with requirements for higher fuel pressures have established the trend toward higher pump speeds. Present pump speeds have increased to the point where fuel seals have become a critical limitation for advances in both pump design and speed.

Accordingly, it is an object of this invention to provide a sealing device for any type of rotating machinery where a liquid gas seal is required which will operate without rubbing parts and thereby eliminate present seal design limitations.

In the present invention, a shaft carrying impeller is supported by a bearing in a housing, and a seal assembly is utilized to prevent leakage of pressurized fluid to the bearing. High pressure fluid flow is restricted by a labyrinth seal, while a centrifugal flinger or pump rotated with the impeller shaft controls the leakage of low pressure fluid by returning any low pressure fluid that may leak past the labyrinth seal to the pressurized fluid chamber. A small quantity of fluid would persistently cling to the housing wall and work toward the shaft bearing or seal vent which is located in front of the bearing. A screw pump is carried on the shaft to prevent this latter leakage by inducing an air flow axially along the shaft toward the flinger. This air may recirculate by means of passageways formed in the shaft which communicate with the opposite ends of the screw pump. Inasmuch as this sealing arrangement will not prevent leakage at extremely low operating speeds of the pump and during shutdown conditions, a flexible lip seal is carried on the shaft which coacts with the housing only during low speed operation of the pump and during shutdown conditions to close off the clearance between the housing and shaft which leads to the shaft bearing.

It is also an object of this invention to provide a fluid sealing arrangement for rotating machinery which makes possible higher rotational speeds, eliminates the need for using a special seal component material, and eliminates the necessity for special seal machining operations, such as precision lapping.

Another object of this invention is in the provision of a seal assembly for rotary pumps that make possible higher pump speeds, smaller pump size and weight for a given capacity, and higher pressure and capacity centrifugal pumps.

A further object of this invention resides in the provision of a seal assembly for use in connection with shafts on rotary pumps which increases pump life and pump efficiency.

A still further object of this invention is to provide a sealing assembly for rotary pumps which eliminates rubbing seal components during pump operation, thereby enabling abrasive fluids to be pumped without damage to the pump seals.

Another feature of this invention to to provide a seal assembly for rotary pumps which eliminates rubbing parts during pump operation, and which includes a flexible seal between the shaft bearing and pressurized fluid chamber of the pump that closes off the clearance between the housing and shaft during extremely slow speed operation of the pump and during shutdown conditions.

Other objects, features, and advantages of the invention will be apparent from the following detailed disclosures, taken in conjunction with the accompanying sheet of drawings, wherein like reference numerals refer to like parts, and in which:

Figure 1 is an axial sectional view, with some parts in elevation, of a centrifugal pump embodying the invention; and Figure 2 is an end elevational view showing the inlet and outlet of the pump in Fig. 1.

As shown on the drawings:

While the present invention will be illustrated and described in connection with a centrifugal pump, it is to be understood that the invention may also be applied to any other type of rotating machinery where a liquid gas seal is required.

Referring to the drawings, a shaft and seal housing 10 includes a bell-shaped portion 11 at one end which coacts with a second substantially bell-shaped member 12 to define a pump casing. The portion 11 and member 12 are suitably secured together by radial flanges and a plurality of nut and bolt assemblies as indicated at 13, and to prevent leakage between the flanges, a conventional resilient O-ring sealing arrangement 14 is employed.

The pump casing is provided with an axial inlet 15 leading to the pumping cavity, and a volute chamber or a high pressure diffuser or collector 16 which leads to the outlet 17.

A rotating shaft 18 driven by any suitable means is received in a bore of the shaft housing 10 and supported by a bearing 19 held by the housing. The bearing 19 is axially spaced from the pumping cavity or chamber. One end of the shaft 18 extends into the pumping cavity and carries an impeller 20.

Fluid entering the inlet 15 passes through rotating impeller vanes 21 of the impeller 20 to the high pressure diffuser or collector 16 and then to the outlet 17.

Excessive leakage flow of high pressure fluid from the diffuser to the inlet is prevented by the conventional close running clearance 22 and a turbulence-type labyrinth seal 23 between the impeller and the pump case.

The seal assembly of the present invention prevents the flow of fluid from the diffuser or collector 12 to the bearing 19. This seal assembly may be defined as a hydraulic centrifugal seal, and includes generally a flinger 24, a screw pump 25, and a rotating lip seal 26.

The flinger, shown as an integral part of the pump impeller 20, consists of a plurality of radially drilled holes 27 and an annular groove 28 at the base of the holes. The outside diameter of the flinger 24 is greater than the outside diameter of the impeller vanes 21, the reason for which will be more fully hereinafter explained.

The screw pump 25 is shown as an integral part of the pump shaft 18, and includes a screw thread 29 which has a close radial clearance with a housing bore 30. A plurality of radial holes 31 and 32 are positioned at opposite ends of the screw thread 29 and interconnected by axial holes or passageways 33, the purpose of which will be hereinafter explained in the operation of the seal.

The rotating lip seal 26 is substantially ring-shaped and fabricated from rubber or other suitable flexible material. The hub of the seal is bonded to the pump shaft 18 and the outer tapered periphery seats as shown with a radial housing flange 35 during extremely low speed operation of the pump and shutdown conditions. In other words, the radial clearance between the shaft and housing as indicated by the numeral 36 is closed off the prevent communication between a seal vent 34 and the pumping cavity during low speed operation and shutdown conditions. Since the flinger 24 and the screw pump 25 prevent leakage during normal shaft rotation, the lip seal 26 is caused to separate from the housing flange 35 by action of centrifugal force and will take the approximate position as shown in dotted lines.

During normal rotational operation of the impeller 20, fluid from the high pressure diffuser 16 is prevented from flowing to the bearing 19 and the seal vent 34 positioned in front of the bearing 19 in the following manner.

High pressure fluid flowing in the flinger clearance 37 is restricted by the turbulence-type labyrinth seal 38. The low pressure fluid which leaks past the labyrinth seal 38 tends to be rotated and thrown radially outward by centrifugal action as it flows through the clearance 39 defined by the housing and the flinger. This fluid then flows to the annular groove 28 and is supplied to the radial flinger holes 27. Since the outside diameter of the flinger is greater than the outside diameter of the pump impeller, the potential pressure developed by the flinger is greater than that which can be developed by the impeller. Consequently, the flinger is always capable of pumping the leakage fluid from the annular groove 28 to the diffuser 16, provided the shaft 18 is rotating and the pressure at the seal vent 34 is approximately equal to the pump inlet pressure.

Although the flinger 24 is capable of handling any of the low pressure fluid leakage, a small quantity of fluid will cling to the housing wall at 40 and 41 and work toward the seal vent 34 resulting in objectionable dripping and possibly damaging the bearing 19. The screw pump 25 is provided to prevent this latter leakage by inducing an air flow axially along the shaft 18 toward the flinger. This air may recirculate by means of the drilled passages 31, 32 and 33, which air circulation scrubs the fluid from the housing bore wall 30 and forces it toward the flinger where it is returned to the diffuser. Centrifugal force prevents the fluid being pumped towards the flinger from entering the radial air circulation passages 31 and 32.

By proper design of the lip seal separation speed, the flinger, and the impeller, inlet boost pressure in excess of the seal vent pressure can be tolerated. In certain applications, however, it may be proved to be more practical to regulate the seal vent pressures so that it equals pump supply pressure.

For sake of simplicity, the bearing 19 is shown as a sealed bearing. In an actual application, however, the bearing grease or oil could be retained by a second hydraulic centrifugal seal such as that which prevents fluid leakage along the shaft 18.

From the foregoing, it is seen that the instant invention provides a seal assembly for use with rotating machinery such as pumps to inhibit fluid leakage along a shaft, which employs no rubbing parts during normal operation. This feature permits higher pump speeds, long pump life and increased pump efficiency.

It will be understood that modifications and variations may be effected without departing from the scope of the novel concepts of the present invention, but it is understood that this application is to be limited only by the scope of the appended claims.

We claim as our invention:

1. In a centrifugal pump, a pump casing having an inlet, a pumping cavity defined by non-resilient interior walls, and an outlet, a shaft and seal housing extending from the side of said casing opposite the inlet, a shaft in said housing having one end extending into the pumping cavity, a bearing carried by said housing and supporting said shaft, said bearing being axially spaced from said cavity, an impeller in said cavity and secured to the end of said shaft, the improvement of a hydraulic centrifugal seal for preventing fluid leakage along the shaft to the bearing including a flinger integral with said impeller and on the backside thereof within said cavity and having a close running clearance with one of said interior walls, said flinger restricting the leakage of low pressure fluid and returning said fluid to said pumping cavity, a turbulence-type labyrinth seal between the flinger and the pumping cavity wall coacting with said close running clearance to restrict the flow of high pressure fluid, a screw pump for inducing an axial air flow along said shaft towards the flinger comprising an external screw thread integral with said shaft and in close radial clearance to said housing and a plurality of passageways in said shaft intercommunicating the opposite ends of the screw thread, wherein a continuous recirculation of air is effected to scrub any fluid from the housing and force it toward the flinger, said flinger, labyrinth seal and screw pump being effective during normal operation of the pump, a flexible cup-shaped tapered lip seal of ring shape, and an inwardly projecting radial flange of said housing having an annular portion substantially parallel with said shaft and directed toward said lip seal, said lip seal and said annular portion coacting to close the radial clearance between the shaft and housing during extremely slow speed operation of the pump and during shutdown periods, said lip seal being between said screw pump and shaft bearing.

2. In a centrifugal pump, a pump casing having an inlet, a pumping cavity, and an outlet; a shaft housing extending from the side of the casing opposite the inlet; a shaft in said housing having one end extending into the pumping cavity; a bearing carried by said housing and supporting said shaft, said bearing being axially spaced from said cavity; and an impeller in said cavity and secured to the end of the shaft; the improvement of a hydraulic seal on said shaft intermediate the pumping cavity and the bearing, said seal including a screw pump for inducing an axial flow of air along said shaft towards the impeller, comprising an external screw thread integral with said shaft and in close radial clearance to said housing and a plurality of passageways in said shaft intercommunicating the opposite ends of the screw thread, wherein a continuous recirculation of air is effected by rotation of the shaft to scrub any fluid from the housing and force it toward the impeller.

3. A hydraulic seal for a shaft rotatably supported within a housing for preventing fluid leakage along the shaft from one end to the other, said seal including a screw pump for inducing an axial flow of air along said shaft towards said one end of the shaft, said pump comprising an external screw thread integral with said shaft and in close radial clearance to said housing, and a plurality of passageways in said shaft intercommunicating the opposite ends of the screw thread, wherein a continuous recirculation of air is effected by rotation of the shaft to scrub any fluid from the housing and shaft and force it toward said one end.

References Cited in the file of this patent

UNITED STATES PATENTS 2,258,527     Warman _____ Oct. 7, 1941

(Other references on following page)

UNITED STATES PATENTS

| | | |
|---|---|---|
| 2,418,707 | Groot | Apr. 8, 1947 |
| 2,478,649 | Wightman | Aug. 9, 1949 |
| 2,571,802 | Wilfley et al. | Oct. 16, 1951 |
| 2,684,034 | Roth | July 20, 1954 |

FOREIGN PATENTS

| | | |
|---|---|---|
| 33,161 | France | Feb. 28, 1929 |
| | (First addition to 610,942) | |
| 35,965 | Austria | Jan. 25, 1905 |
| 100,858 | Great Britain | July 16, 1920 |
| 194,535 | Switzerland | Apr. 26, 1935 |
| 325,930 | Great Britain | Mar. 6, 1930 |
| 380,886 | Great Britain | Sept. 29, 1932 |
| 703,866 | Germany | Mar. 18, 1941 |
| 876,642 | Germany | Apr. 2, 1953 |